United States Patent Office 3,197,367
Patented July 27, 1965

3,197,367
PREGNENOLONE HEMISUCCINATE COMPOSITIONS AND THERAPY
Frank P. Panzarella, Valley Stream, N.Y., assignor to Doak Pharmacal Company, Inc., New York, N.Y., a corporation of New York
No Drawing. Filed Oct. 24, 1960, Ser. No. 64,304
9 Claims. (Cl. 167—58)

This invention relates to the discovery of a composition of outstanding utility in alleviating allergic, pruritic and inflammatory skin conditions. This invention also contemplates a process for ameliorating allergic, pruritic and inflammatory skin disorders by the topical application of this composition.

The subject application is a continuation-in-part of copending application Serial No. 782,976, filed December 24, 1958, now abandoned, which is a continuation-in-part of application Serial No. 670,380, filed July 8, 1957, also now abandoned.

This invention involves the discovery that pregnenolone hemi-esters of hydrocarbon dicarboxylic acids and their salts are particularly effective in alleviating allergic, pruritic and inflammatory skin conditions if used topically.

In accordance with this invention, pregnenolone hemi-esters of hydrocarbon dicarboxylic acids and their alkali metal, alkaline earth metal, ammonium and alkanolamine salts are effective agents for topical treatment of allergic, pruritic and inflammatory skin conditions when employed in compositions in which their concentration exceeds 0.5 weight percent. Extensive clinical investigation has demonstrated that pregnenolone dicarboxylic acid hemi-esters and their salts are approximately equivalent to corticosteroids such as hydrocortisone in relieving symptoms of allergic, pruritic and inflammatory dematoses when applied topically. The therapeutic action with pregnenolone hemi-esters of dicarboxylic acids and their salts was not accompanied by any of the undesirable side effects characteristic of corticosteroid therapy. The pregnenolone hemi-esters of hydrocarbon dicarboxylic acids and their salts proven to be effective in topical treatment of dermatoses are represented by the following formula:

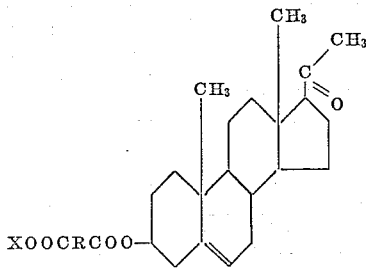

wherein X is hydrogen, an alkali metal, an alkaline earth metal, NH₄ or an alkanolamine radical in which the hydroxyalkyl radical contains 2 to 4 carbon atoms and R is a divalent hydrocarbon radical containing 1 to 12 carbon atoms.

It has been found that pregnenolone dicarboxylic hemi-esters and their salts must be present in the medication in a concentration of at least 0.5 weight percent and preferably a concentration of at least 1.5 weight percent in order to obtain significant therapeutic action. Since dusting powders consisting of 100 percent pregnenolone dicarboxylic acid hemi-ester and salts thereof have proven effective in alleviating severe allergic and pruritic skin conditions, the upper concentration limit is 100 percent. Compositions intended for topical treatment of dermatoses usually contain between 1.5 and 10 weight percent of the active pregnenolone hemi-ester or salt in the form of a lotion, ointment or cream.

One of the features of the present invention is the discovery that pregnenolone dicarboxylic acid hemi-esters are equally effective as topical therapeutic agents as their salts, whose use in topical treatment of allergic and pruritic skin conditions forms the subject matter of the afore-identified parent application. It is believed that the free acids are converted to salts upon absorption by the skin. The active therapeutic moiety is apparently the pregnenolone dicarboxylic acid hemi-ester radical.

The alkali metal and alkanolamine salts are the preferred therapeutic agents of this invention because of their lower cost, rapid assimilation by skin tissues during topical use and compatibility with the common materials used as bases in the formulation of ointments, lotions and creams. The sodium and potassium salts are the preferred alkali metal salts.

Alkanolamines of the general formula $(HOR')_n NH_{3-n}$, wherein $R'$ is a divalent aliphatic hydrocarbon radical containing 2 to 4 carbon atoms and $n$ has a value of 1 to 3, constitute the preferred materials for reaction with pregnenolone dicarboxylic acids to form salts. Diethanolamine, monoethanolamine, triethanolamine, dipropanolamine, tripropanolamine and monobutanolamine are all used in making pregnenolone hemi-ester alkanolamine salts. The triethanolamine salts of pregnenolone hemi-esters are a particularly preferred group of active therapeutic materials for topical use.

Alkaline earth metal salts of pregnenolone hemi-esters, such as the calcium and barium salts, may also be employed, but their reduced water solubility and the difficulty of making stable lotions therewith detract from their usefulness as therapeutic agents.

Mixtures comprising 1 part by weight of the pregnenolone dicarboxylic acid hemi-ester and 1 to 3 parts by weight of a pregnenolone hemi-ester salt have been found to be particularly effective in the topical treatment of allergic and pruritic dermatoses. The pregnenolone hemi-ester not only provides an active therapeutic material but also acts as a buffering agent and aids in maintaining the pH range of the medication in the 3.5 to 8.0 range desired for topical treatment. Lactic acid has also been used in pregnenolone hemi-ester salts containing compositions to give the desired pH range, but it does not possess the effective therapeutic action of the pregnenolone hemi-ester itself.

Pregnenolone hemi-esters are derived from hydrocarbon dicarboxylic acids containing 3 to 14 carbon atoms with aliphatic dicarboxylic acids containing 4 to 10 carbon atoms being preferred. Examples of the preferred pregnenolone hemi-esters derived from aliphatic dicarboxylic acids are the following: pregnenolone hemisuccinate, pregnenolone hemiadipate, pregnenolone hemimaleate, pregnenolone hemi-sebacate and pregnenolone hemi-azelate. Pregnenolone hemi-esters derived from aryl and cyclo-aliphatic dicarboxylic acids are also effective therapeutic agents, either per se or in the form of their salts, and are illustrated by the following: pregnenolone hemi-phthalate, pregnenolone hemi-terephthalate, pregnenolone hemi-isophthalate and pregnenolone hemi-tetrahydrophthalate.

Pregnenolone hemi-esters are prepared by reacting the dicarboxylic acid anhydride with pregnenolone in the presence of pyridine. The reaction product is dissolved in ether, washed with hydrochloric acid and then with water. On removal of the ether, there is obtained a pregnenolone hemi-ester which can be converted to a salt, if desired, by reaction with a metal alcoholate or with an alkanolamine in an alcohol reaction medium.

In topical use, pregnenolone hemi-esters and their salts are employed per se as dusting powers, but are generally used in the form of creams, ointments and lotions. Aerosol use of these compounds is also recommended. The most commonly used bases for creams and ointments are the water-soluble polyalkylene glycols such as polyethylene glycols, polypropylene glycols and heteropolymers of ethylene and propylene oxides. Another vehicle is cholesterolized petrolatum which comprises a mixture of about 70 weight per cent of the nonsaponifiable portion of lanolin and 30 weight per cent petrolatum. In preparations of lotions and of solutions for the treatment of nose and eye disturbances, water-dispersible pregnenolone hemi-esters and their salts are used in an aqueous vehicle.

It has also been found advisable to use a small amount of an antibiotic in conjunction with the pregnenolone hemi-esters and their salts when allergic and inflammatory skin, eye and nose disorders are complicated by the presence of a superimposed infection. Penicillin, streptomycin, neomycin, terramycin and chloromycetin are compatible with the salts of pregnenolone hemi-esters and free acids and can be used in conjunction therewith. The recommended concentration of an antibiotic where infection is present is 0.1 to 1.0 weight percent of the composition containing the hemi-ester or salt thereof.

It has also been found advantageous to use tar or tar distillate in concentrations of 0.2 to 6 weight percent of the hemi-ester salt-containing composition. Apparently, the tar distillate functions as a decongestant and antipruritic when used in conjunction with salts of pregnenolone hemi-esters.

The effectiveness of pregnenolone hemi-esters and their salts in the treatment of allergic, pruritic and inflammatory skin disorders was established in a clinical investigation in which the relative merits of topical preparations containing 2 percent pregnenolone, 2 percent sodium pregnenolone hemisuccinate and 1 percent hydrocortisone were compared. The procedure followed in this clinical study is outline as follows:

Thirty-five patients, the majority of whom had severe atopic, contact, neuro, exfoliative numular and seborrheic dermatoses, were selected. These separate disease categories may be considered as representative of the broad class of skin conditions in which the primary underlying factor is believed to be intrinsic or extrinsic allergy or inflammatory processes associated with appearance of one or more of the following symptoms or signs, to wit, pruritis, inflammation and lesions.

The thirty-five patients were divided into two groups, the first consisting of sixteen patients and the second of nineteen patients. All the subjects showed evidence of inflammatory and pruritic dermatoses with or without skin lesions with bilateral involvement.

Each patient of the first group (Group No. 1) received two jars of ointment or two bottles of lotion. One of the two jars and one of the two bottles contained 2 per cent pregnenolone incorporated in ointment or lotion, and the companion jar of ointment or bottle of lotion contained 1 percent hydrocortisone; other than this difference, the ointments and lotions had similar compositions. The patients were carefully instructed to apply one medication on one side of the body and the other medication on the contralateral areas three or four times daily. The remaining nineteen patients (Group No. 2) followed the same regimen, except that the two test materials consisted of 2 percent sodium pregnenolone hemi-succinate and 1 percent hydrocortisone in ointments and lotions of similar composition. All patients were maintained on their respective therapeutic regiments for two to three weeks, during which time the identity of the test products were not revealed to them.

Degree of improvement was noted daily by patients and at weekly intervals by the clinical investigators. Results were classified on an absolute as well as comparative basis. Results were considered satisfactory when there was good to excellent abatement of the pruritis and inflammation with corresponding degree of healing of lesions and amelioration of appearance of skin. A fair, equivocal or no response was designated as unsatisfactory. In addition, the relative efficacies of the two medications with respect to the above symptoms were also determined in each individual.

The results of this investigation are summarized as follows:

In Group No. 1, wherein the effectiveness of 2 percent pregnenolone was compared with 1 percent hydrocortisone, it was found that nine of the patients obtained the same degree of improvement with pregnenolone as was obtained with hydrocortisone, while seven of the patients showed a poorer response to pregnenolone than to hydrocortisone. Nine of the sixteen patients treated with 2 percent pregnenolone secured satisfactory (good to excellent) response, while seven showed unsatisfactory (equivocal or fair) improvement. One percent hydrocortisone applied on the contralateral areas provided satisfactory response in thirteen cases and unsatisfactory results in three.

In the comparative evaluation of sodium pregnenolone hemisuccinate and hydrocortisone in Group No. 2, it was found that eighteen patients showed satisfactory response with both therapeutic agents. The comparative evaluation showed that the five patients responded better to the sodium pregnenolone hemisuccinate treatment than to the hydrocortisone treatment and that about equal response was obtained from thirteen patients, while one patient showed better response to the hydrocortisone.

These results with both groups of patients are summarized in Table I.

TABLE I

Summary of results of topical use of 2% pregnenolone, 2% sodium pregnenolone hemisuccinate and 1% hydrocortisone in the treatment of allergic, inflammatory and pruritic skin disorders

[Group No. 1]

| Patients, No. | Steroid Employed | Therapeutic Effectiveness | | | |
|---|---|---|---|---|---|
| | | Satisfactory Response | | Unsatisfactory Response | |
| | | No. | Percent | No. | Percent |
| 16 | 2% Pregnenolone | 9 | 56.2 | 7 | 43.8 |
| 16 | 1% Hydrocortisone | 13 | 81.3 | 3 | 18.7 |

[Group No. 2]

| | | | | | |
|---|---|---|---|---|---|
| 19 | 2% Sodium Pregnenolone Hemisuccinate | 18 | 94.7 | 1 | 5.3 |
| 19 | 1% Hydrocortisone | 18 | 94.7 | 1 | 5.3 |

The comparative evaluation indicated that, although pregnenolone and salts of pregnenolone hemi-esters are all of therapeutic value in the treatment of pruritic and inflammatory skin diseases, sodium pregnenolone hemisuccinate was the most effective of the three materials evaluated. In Table II, there is shown the effectiveness of pregnenolone and sodium pregnenolone hemi-succinate in comparison with hydrocortisone as a standard.

TABLE II

*Relative efficacy of 2% pregnenolone and 2% sodium pregnenolone hemisuccinate*

| Steroid Employed | Better Therapeutic Response Than 1% Hydrocortisone | | Same Therapeutic Response as 1% Hydrocortisone | | Poorer Therapeutic Response Than 1% Hydrocortisone | |
|---|---|---|---|---|---|---|
| | No. | Percent | No. | Percent | No. | Percent |
| 2% Pregnenolone | 0 | 0 | 9 | 56.2 | 7 | 43.8 |
| 2% Sodium Pregnenolone Hemisuccinate | 5 | 26.3 | 13 | 68.4 | 1 | 5.3 |

In this clinical study, no undesirable side effects were observed. The patients indicated particularly favorable response to the sodium pregnenolone hemisuccinate.

The effectiveness of pregnenolone hemi-esters per se in the topical treatment of dermatitis was proven by the following series of experiments:

Nine hospitalized patients suffering from severe atopic eczema were treated with an ointment containing 2 percent pregnenolone hemisuccinate. The ointment employed in this evaluation was a petrolatum based material in which pregnenolone hemisuccinate was the active therapeutic agent. Prior to the instant treatment, a variety of topical preparations had been used with indifferent results. As a result of treatment with the pregnenolone hemisuccinate-containing ointment for a period of approximately two weeks, eight of the patients showed marked improvement with complete control of pruritus and improvement of skin lesions. In one patient, no noticeable improvement was realized.

The effectiveness of pregnenolone hemi-esters and their salts in high concentration was demonstrated by a series of experiments in which both pregnenolone hemisuccinate and its sodium salt were used separately in the form of dusting powder in the treatment of skin conditions:

Two patients, one with pruritis ani and the other with contact dermatitis, employed a medication comprising 100 percent pregnenolone hemisuccinate in the form of a fine dusting powder. In both cases, application of the medication on a once-daily basis effectively alleviated the conditions; in the first patient, the pruritis was controlled, and in the second patient, there was a marked improvement in the appearance of the skin lesions.

Two other patients, one suffering from atopic eczema and the other with a contact dermatitis, used, on a once-daily basis, a medication comprising 100 percent sodium pregnenolone hemisuccinate as a fine dusting powder. In both cases, the daily application was effective in controlling itching, reducing inflammation and improving the lesions.

Compositions comprising a triethanolamine salt of pregnenolone hemisuccinate in a concentration of approximately 2 weight percent as the active therapeutic ingredient have been widely evaluated in the topical treatment of a large number of skin disorders. More than four hundred patients having allergic, inflammatory ad pruritic skin conditions have shown excellent therapeutic response to compositions containing the triethanolamine salt of pregnenolone hemisuccinate as the active therapeutic agent. In the opinion of the more than ten independent, skilled dermatologists who have conducted these evaluations under controlled clinical conditions, the results obtained with the medications containing the triethanolamine salt of pregnenolone hemisuccinate have been consistently equivalent or superior to results obtained with corticosteroid therapy in comparable skin disorders.

The effectiveness of pregnenolone hemi-esters derived from other dicarboxylic acids was demonstrated by the evaluation of compositions containing trialkanolamine salts of pregnenolone hemi-phthalate and pregnenolone hemi-maleate in the treatment of skin disorders. A cream containing 2 percent of the triethanolamine salt of pregnenolone hemi-maleate was used by twelve patients, and a lotion containing 2 percent of the triethanolamine salt of pregnenolone hemi-phthalate was evaluated by eighteen patients. The results obtained on these evaluations are summarized as follows:

Of the twelve patients treated with the cream containing triethanolamine salt of pregnenolone hemi-maleate as the active therapeutic agent, seven were males, seven were females and their ages ranges from two and a half to forty-eight years; four were diagnosed as having contact dermatitis, six atopic eczema and two pruritis ani. The medication was applied to the affected areas two to four times daily for an average of two weeks on all patients. The response noted in this study was satisfactory in all cases and compared favorably with the results obtained in a study employing a pregnenolone hemisuccinate salt as the active ingredient. The pruritis usually subsided in three to ten minutes, and relief lasted as long as three to six hours; inflammation and appearance of lesions showed definite improvement within the first twenty-four hours and cleared in four days to three weeks.

Eighteen patients comprising ten males and eight females ranging in age from five to fifty-seven years were treated with a lotion containing 2 percent triethanolamine hemi-phthalate for a period of two weeks. These patients all had atopic dermatitis marked by lichenification and itching, with weeping and crusting lesions being present in some cases. The patients applied the lotion containing the triethanolamine salt of pregnenolone hemi-phthalate four times daily and were examined after seven and fourteen days of treatment. Twelve of the eighteen patients employing this medication showed good to excellent improvement, and three showed moderate improvement, while in three cases the response was equivocal. The patients showing good to excellent improvement noted relief of itching within three to ten minutes after application, and the affected area became much smoother in appearance within fourteen days. In the three patients showing moderate improvement, itching was relieved satisfactorily, but only fair skin improvement was noted. In the three patients in which the results were adjudged to be equivocal, fair relief of itching was noted, but there was no noticeable improvement in the skin lesions.

Typical compositions of this invention employed in topical treatment comprise 40 to 80 weight percent water, 1 to 10 percent emulsifying agents, such as sodium stearate and sorbitan mono-oleate, 2 to 8 percent low molecular weight alcohol, such as isopropyl alcohol, minor amounts, e.g., 1.0 percent, antiseptic material such as Methyl Parasept, and 1.0 to 10.0 percent pregnenolone hemi-ester, hemi-ester salt or mixture thereof. As a buffering agent, 1.0 to 10 weight percent lactic acid is often used. A typical lotion comprises approximately 74 percent water, 16 percent of a mixture of emulsifying agents, including lanolin, 4 percent isopropyl alcohol, 2 percent sodium lactate, 2 percent lactic acid and 1.0 to 10.0 weight percent pregnenolone hemi-ester salt.

Obviously, many modifications and variations of the invention, as hereinbefore set forth, may be made without departing from the spirit and scope thereof, and, therefore, only such limitations should be imposed as are indicated in the appended claims.

I claim:

1. A topical composition useful in alleviating allergic, pruritic and inflammatory dermatitis comprising a vehicle suitable for topical use and containing at least 0.5 weight percent of an active therapeutic agent selected from the group consisting of pregnenolone hemisuccinate, the alkali metal salts, the alkaline earth metal salts, the alkanolamine salts of said pregnenolone hemisuccinate and mixtures thereof, said alkanolamine having a hydroxyalkyl group containing 2 to 4 carbon atoms.

2. A composition according to claim 1 in which said therapeutic agent is the sodium salt of pregnenolone hemisuccinate.

3. A composition according to claim 1 in which said therapeutic agent is the triethanolamine salt of pregnenolone hemisuccinate.

4. A composition according to claim 1 in which said therapeutic agent is pregnenolone hemisuccinate.

5. A method for alleviating allergic, pruritic and inflammatory dermatoses by applying topically to the involved area a composition comprising a vehicle suitable for topical use and containing an active therapeutic agent selected from the group consisting of pregnenolone hemisuccinate, the alkali metal salts, alkaline earth metal salts, alkanolamine salts of said pregnenolone hemisuccinate and mixtures thereof, said alkanolamine having a hydroxyalkyl group containing 2 to 4 carbon atoms, said therapeutic agent being present in said composition in a concentration of at least 1 weight percent.

6. A method according to claim 5 in which said composition contains 1.5 to 5.0 weight percent alkali metal salt of pregnenolone hemisuccinate.

7. A method according to claim 5 in which said composition contains 1.5 to 5.0 weight percent sodium pregnenolone hemisuccinate.

8. A method according to claim 5 in which said composition contains 1.5 to 5.0 weight percent triethanolamine salt of pregnenolone hemisuccinate.

9. A method according to claim 5 in which said composition contains 1.5 to 5.0 weight percent pregnenolone hemisuccinate.

References Cited in the file of this patent

UNITED STATES PATENTS

| 2,708,651 | Laubach | May 17, 1955 |
| 2,791,534 | Schaaf et al. | May 7, 1957 |
| 2,871,160 | Johnson et al. | Jan. 27, 1959 |

OTHER REFERENCES

Myers et al.: C.L.M.L., vol. 21, entry No. 25528, 1952.
De Torres: C.L.M.L., vol. 21, entry No. 27814, 1952.
McGavack: C.L.M.L., vol. 21, entry No. 37333, 1952.
Higgins et al.: C.L.M.L., vol. 21, entry No. 6993, 1952.
Mendell et al.: C.L.M.L., vol. 23, entry No. 39567.
Lenggenhager: C.L.M.L., vol. 32, entry No. 35997.
France et al.: Current List of Medical Literature, vol. 21, entry No. 22818, 1952.
Lamb et al.: A.M.A. Archives, Derm. and Syphil., 67(2), February 1953, pages 141–145.

LEWIS GOTTS, *Primary Examiner.*

WILLIAM B. KNIGHT, FRANK CACCIAPAGLIA, Jr., IRVING MARCUS, *Examiners.*